(12) United States Patent
Uwatoko et al.

(10) Patent No.: US 7,676,703 B2
(45) Date of Patent: Mar. 9, 2010

(54) FAILURE DIAGNOSIS SYSTEM, IMAGE FORMING APPARATUS, COMPUTER READABLE MEDIUM AND DATA SIGNAL

(75) Inventors: Koki Uwatoko, Kanagawa (JP); Kaoru Yasukawa, Kanagawa (JP); Tetsuichi Satonaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 490 days.

(21) Appl. No.: 11/653,400

(22) Filed: Jan. 16, 2007

(65) Prior Publication Data
US 2008/0010522 A1 Jan. 10, 2008

(30) Foreign Application Priority Data
Jun. 9, 2006 (JP) .............................. 2006-160373

(51) Int. Cl.
*G06F 11/00* (2006.01)
(52) U.S. Cl. .......................................... 714/48; 714/26
(58) Field of Classification Search .................... 714/48, 714/26
See application file for complete search history.

(56) References Cited

U.S. PATENT DOCUMENTS

| | | | |
|---|---|---|---|
| 6,345,265 B1 * | 2/2002 | Thiesson et al. ............... 706/52 |
| 6,456,622 B1 * | 9/2002 | Skaanning et al. .......... 370/389 |
| 6,535,865 B1 * | 3/2003 | Skaaning et al. .............. 706/52 |
| 6,574,537 B2 * | 6/2003 | Kipersztok et al. ............ 701/29 |
| 6,665,425 B1 | 12/2003 | Sampath et al. |
| 6,691,249 B1 * | 2/2004 | Barford et al. ................. 714/25 |
| 6,785,636 B1 * | 8/2004 | Darken et al. ............... 702/185 |
| 6,879,973 B2 * | 4/2005 | Skaanning et al. ............ 706/52 |
| 6,957,202 B2 | 10/2005 | Skaanning et al. |
| 7,006,947 B2 * | 2/2006 | Tryon et al. .................. 702/183 |
| 7,260,501 B2 * | 8/2007 | Pattipatti et al. ............. 702/183 |
| 2002/0138184 A1 * | 9/2002 | Kipersztok et al. ............ 701/29 |

(Continued)

FOREIGN PATENT DOCUMENTS

JP A 10-209230 8/1998

(Continued)

OTHER PUBLICATIONS

Giovanni Betta, Feb. 2000, IEEE Transactions on instrumentation and measurement, vol. 49, No. 1.*

*Primary Examiner*—Scott T Baderman
*Assistant Examiner*—Kamini Patel
(74) *Attorney, Agent, or Firm*—Oliff & Berridge, PLC

(57) ABSTRACT

A failure diagnosis system includes a first database, a second database, an observation-information acquiring unit, a determination-probability calculating unit and an occurrence-probability calculating unit. A first cause-and-effect network stored in the first database stochastically represents a relationship between failure-type candidates and first observation information, which have cause-and-effect relationships with the failure-type candidates. Each second cause-and-effect network stored in the second database stochastically represents relationships between second observation information and failure-cause candidates. The observation-information acquiring unit acquires the first and second observation information from a diagnosed system. The determination-probability calculating unit calculates a determination probability of each failure-type candidate based on the first observation information and the first cause-and-effect network. The occurrence-probability calculating unit calculates occurrence probabilities of the failure-cause candidates for each failure-type candidate based on the second observation information and the second cause-and-effect networks.

6 Claims, 11 Drawing Sheets

U.S. PATENT DOCUMENTS

| | | | |
|---|---|---|---|
| 2003/0101012 A1* | 5/2003 | Parvin et al. | 702/84 |
| 2005/0028033 A1* | 2/2005 | Kipersztok et al. | 714/27 |
| 2005/0262394 A1* | 11/2005 | Yasukawa et al. | 714/23 |
| 2006/0064291 A1* | 3/2006 | Pattipatti et al. | 703/14 |
| 2006/0074591 A1* | 4/2006 | Jammu et al. | 702/182 |
| 2008/0109686 A1* | 5/2008 | Nikaido et al. | 714/57 |
| 2008/0281771 A1* | 11/2008 | Lai et al. | 706/55 |

FOREIGN PATENT DOCUMENTS

| | | |
|---|---|---|
| JP | A 2001-75808 | 3/2001 |
| JP | A 2001-245091 | 9/2001 |
| JP | A 2003-50988 | 2/2003 |

* cited by examiner (a) EXAMPLE OF DIAGNOSIS MODEL FOR BLACK LINE (b) EXAMPLE OF DIAGNOSIS MODEL FOR POINT (C) EXAMPLE OF DIAGNOSIS MODEL FOR SCUMMING

FIG. 11

| DIAGNOSIS MODEL | OCCURRENCE PROBABILITY OF DEFECT TYPE | PROBABILITY OF FAILURE CAUSE (FLAW OF PLATEN) C1 | PROBABILITY OF FAILURE CAUSE (FAILURE OF BOARD A) C2 | PROBABILITY OF FAILURE CAUSE (FLAW OF DRUM) C3 | PROBABILITY OF FAILURE CAUSE (DIRT OF MIRROR) C4 | PROBABILITY OF FAILURE CAUSE (FUSER OFFSET) C5 | ... |
|---|---|---|---|---|---|---|---|
| M1: LINE | P(M1) | P(C11) | P(C12) | P(C13) | | P(C15) | ... |
| M2: POINT | P(M2) | P(C21) | | P(C23) | | P(C25) | ... |
| M3: SCUMMING | P(M3) | | P(C32) | | P(C34) | P(C35) | ... |
| ... | ... | ... | ... | ... | ... | ... | ... |
| TOTAL SUM OF PROBABILITIES | | $\Sigma$ P(Mi) / P(Ci1) | $\Sigma$ P(Mi) / P(Ci2) | $\Sigma$ P(Mi) / P(Ci3) | $\Sigma$ P(Mi) / P(Ci4) | $\Sigma$ P(Mi) / P(Ci5) | |

FAILURE DIAGNOSIS SYSTEM, IMAGE FORMING APPARATUS, COMPUTER READABLE MEDIUM AND DATA SIGNAL

CROSS-REFERENCE TO RELATED APPLICATIONS

This application is based on and claims priority under 35 U.S.C. §119 from Japanese Patent Application No. 2006-160373 filed Jun. 9, 2006.

BACKGROUND

1. Technical Field

This invention relates to a failure diagnosis system, an image forming apparatus and a computer readable medium storing a failure diagnosis program and a data signal embedded with the failure diagnosis program.

2. Related Art

Hitherto, in office machines such as a copier and a printer, a professional serviceperson has been dispatched for executing periodic maintenance to maintain good quality. However, the manner of a failure has also become complicated with colorization and advanced function of office machines in recent years. In some cases, even the professional serviceperson cannot determine the cause of the failure and it is necessary to lessen the down time of client's machine as much as possible. Therefore, the case frequently occurs where plural parts seeming to be involved in the failure are replaced collectively. Normal parts are replaced together, resulting in an increase in the service cost.

SUMMARY

According to an aspect of the invention, a failure diagnosis system includes a first cause-and-effect network, plural second cause-and-effect networks, an observation-information acquiring unit, a determination-probability calculating unit, an occurrence-probability calculating unit and a failure-cause notifying unit. The first database stores a first cause-and-effect network. The first cause-and-effect network stochastically represents a relationship between a plurality of failure-type candidates and first observation information, which have cause-and-effect relationships with the respective failure-type candidates. The second database stores a plurality of second cause-and-effect networks for the respective failure-type candidates. Each of the second cause-and-effect networks stochastically represents relationships between second observation information and the failure-cause candidates. The observation-information acquiring unit acquires the first observation information and the second observation information from a diagnosed system. The determination-probability calculating unit calculates a determination probability of each failure-type candidate based on the first observation information acquired by the observation-information acquiring unit and the first cause-and-effect network. The occurrence-probability calculating unit calculates occurrence probabilities of the failure-cause candidates for each failure-type candidate based on the second observation information acquired by the observation-information acquiring unit and the second cause-and-effect networks. The failure-cause notifying unit notifies at least one of the failure-cause candidates as a failure cause, based on the determination probabilities of the respective failure-type candidates calculated by the determination-probability calculating unit and the occurrence probabilities of the respective failure-cause candidates calculated by the occurrence-probability calculating unit.

BRIEF DESCRIPTION OF THE DRAWINGS

Exemplary embodiments of the invention will be described below in detail with reference to the accompanying drawings wherein:

FIG. 11 is a table to describe the example of the procedure for calculating the occurrence probabilities of the failure causes.

DETAILED DESCRIPTION

Referring now to the accompanying drawings, exemplary embodiments of the invention will be described.

Figure 1:
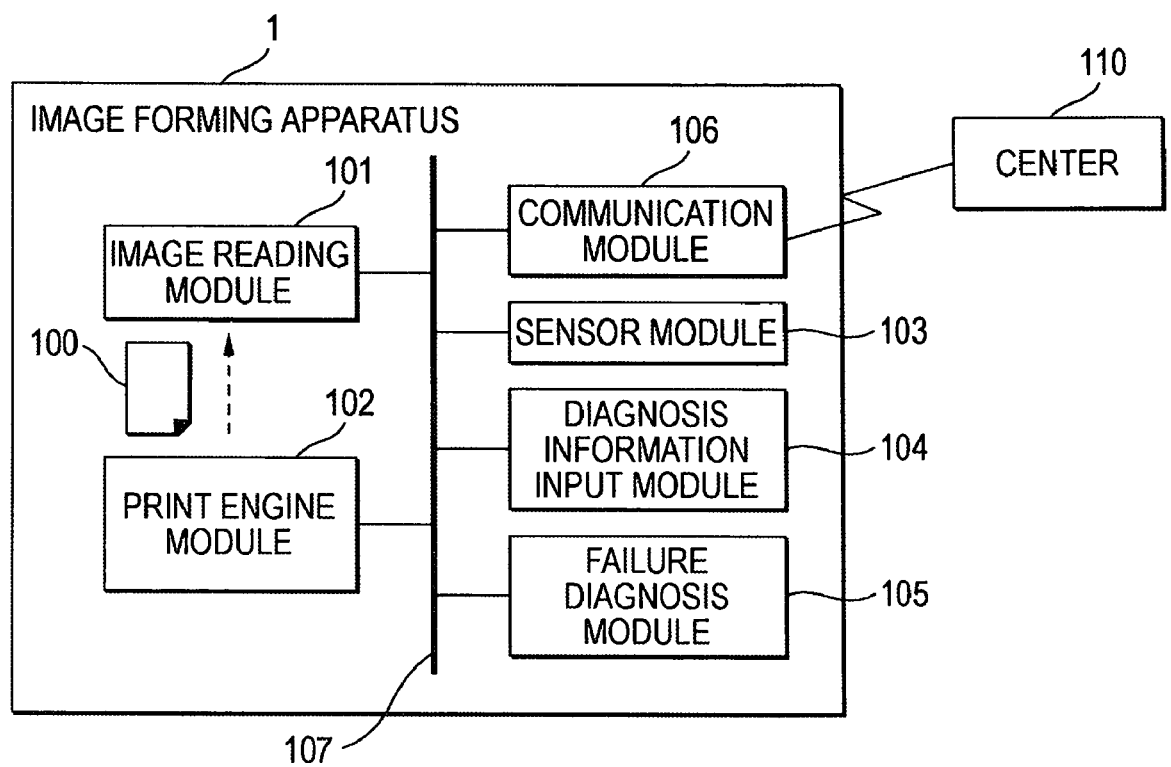
FIG. 1 is a block diagram to schematically show an image forming apparatus according to an exemplary embodiment of the invention.

FIG. 1 is a schematic module configuration diagram according to one exemplary embodiment of the invention.

A "module" generally refers to a logically detachable part of software or hardware. The "module" in this exemplary embodiment means not only a module in a program, but also a module in the hardware configuration. Therefore, the exemplary embodiment servers as description on a program, a system and a method. Modules are almost in a one-to-one correspondence with functions. However, in implementation, one module may be one program; plural modules may be formed of one program; or plural programs may make up one module. Plural modules may be executed by one computer; or one module may be executed in plural computers in a distributed or parallel environment. In the following description, a "connection" contains not only physical connection, but also logical connection.

A "system" is not only a system made up of plural computers, plural hardware and/or plural devices, which are connected by a network, but also a system implemented as one computer.

This exemplary embodiment will be described mainly by illustrating an image forming apparatus to which a failure diagnosis system is applied. A specific image forming apparatus includes at least a printer, a copier, a facsimile or a multiple function machine (also called a multifunctional copier and having functions of a scanner, a printer, a copier and a facsimile).

This exemplary embodiment shows the determination accuracy of a defect type stochastically, calculate the failure probability on which the determination accuracies in plural diagnosis models are reflected, combining the probabilities of the failure causes common to the diagnosis models, and outputting the results in the probability order (from high to low) as a whole. If sufficient observation data required for determining the failure type cannot be acquired and an erroneous determination occurs, it is possible to totally determine the failure cause by reflecting the diagnosis result from plural diagnosis models without a diagnosis model being uniquely determined. Consequently, it is possible to conduct more accurate diagnosis.

An image forming apparatus 1 includes: an image reading module 101 for reading an original image; a print engine module 102 for forming and outputting the read image or an image whose print is commanded; a sensor module 103 containing one or more sensors for obtaining internal status information of the image forming apparatus 1 such as a paper passage time, a drive current and apparatus internal temperature/humidity; a diagnosis information input module 104 for inputting information required for failure diagnosis; a failure diagnosis module 105 for conducting a failure diagnosis of the apparatus based on the acquired information; a communication module 106 connected to an external center 110 via a communication line; and a bus 107 for connecting the modules.

To conduct the failure diagnosis of the image forming apparatus 1, the print engine module 102 outputs a sheet of output paper 100 and inputs the sheet of output paper 100 to the image reading module 101.

The failure diagnosis result may be displayed for the operator of the image forming apparatus 1 or may be reported to the center 110 through the communication module 106.

Figure 2:
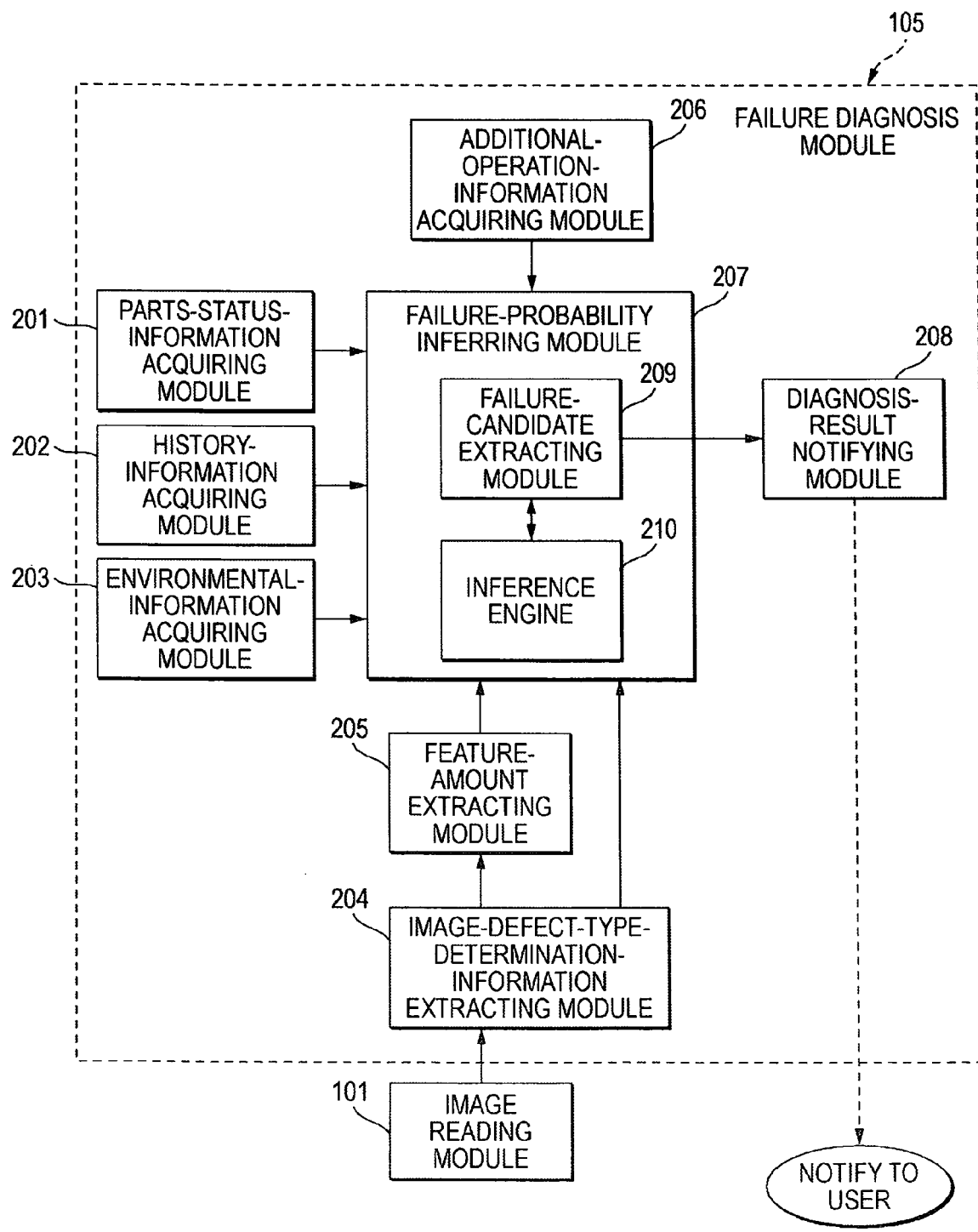
FIG. 2 is a block diagram to schematically show one configuration example of a failure diagnosis module.

FIG. 2 is a block diagram to schematically show one configuration example of the failure diagnosis module 105.

A parts-status-information acquiring module 201 acquires, as observation data information, parts information indicating an operation status of each part based on the internal status information of the image forming apparatus 1 acquired by the sensor module 103.

A history-information acquiring module 202 acquires, as history information, a monitoring result of a usage status of the image forming apparatus 1. For example, the history information indicates that when, how many sheets of paper and which size of paper the image forming apparatus 1 output.

An environmental-information acquiring module 203 directly acquires environmental information of the image forming apparatus 1 or acquires environmental information of the image forming apparatus 1 acquired by the sensor module 103.

An image-defect-type-determination-information extracting module 204 compares the image read by the image reading module 101 (inspected image) with a reference image for inspection, analyzes a defective condition of the output image, and extracts information required for determining a defect type (e.g., defect in area, defect in shape or defect in density).

A feature-amount extracting module 205 extracts various feature amounts (e.g., line width information, periodicity information and occurrence portion information) from the analysis result generated by the image-defect-type-determination-information extracting module 204.

An additional-operation-information acquiring module 206 acquires failure information under a different condition input by a user's operation.

A failure-probability inferring module 207 infers a failure cause based on the information provided by the modules, namely, the parts-status-information acquiring module 201, the history-information acquiring module 202, the environmental-information acquiring module 203, the image-defect-type-determination-information extracting module 204, the feature-amount extracting module 205 and the additional-operation-information acquiring module 206. With regard to the parts-status-information acquiring module 201, the history-information acquiring module 202, the environmental-information acquiring module 203, the image-defect-type-determination-information extracting module 204, the feature-amount extracting module 205 and the additional-operation-information acquiring module 206, at least one of the information provided by the modules 201 to 206 is used, and it is not necessary to use all the information.

A diagnosis-result notifying module 208 notifies the user of the diagnosis result, namely, the failure cause.

Further, the failure-probability inferring module 207 has a failure-candidate extracting module 209 and an inference engine 210.

The inference engine 210 calculates, for example, a probability that each cause candidate causing a failure is the main cause of the failure (failure cause probability), based on the acquired information.

The failure-candidate extracting module 209 narrows down the failure cause candidates based on the failure cause probability calculated by the inference engine 210.

The Bayesian network is used in the inference engine 210 to calculate the failure cause probability. The "Bayesian network" represents a problem area, which is complicated in a cause-and-effect relationship, by means of a network having a graph structure obtained by connecting the cause-and-effect relationships among variables. The "Bayesian network" represents dependence relationships among the variables with a directed graph. Alternatively, the failure-probability inferring module 207 may infer the failure cause using a case-based expert system or adopt a method using a neural network.

Figure 3:
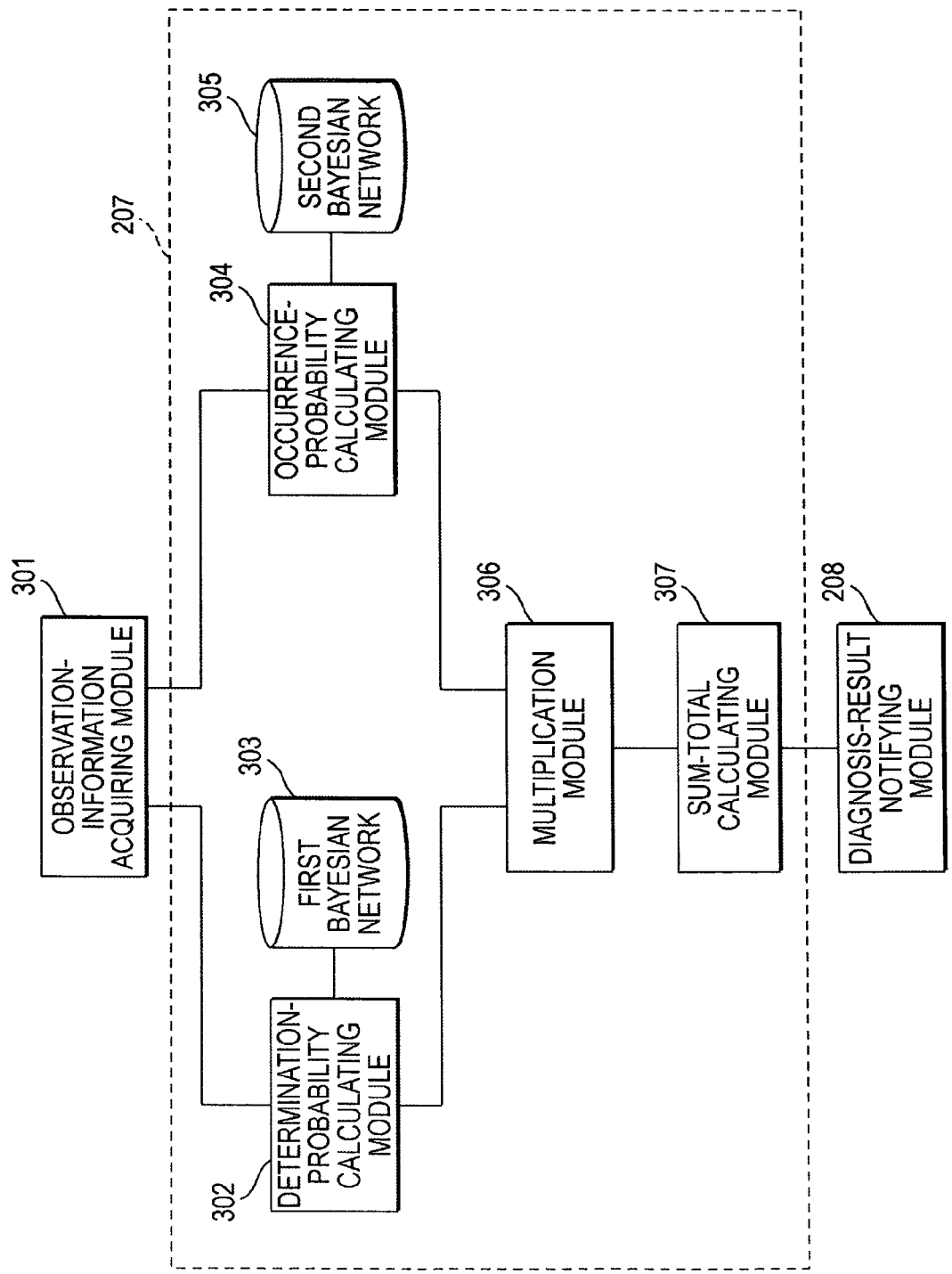
FIG. 3 is a block diagram to schematically show one configuration example of a failure-probability inferring module.

FIG. 3 is a block diagram to schematically show one configuration example of the failure-probability inferring module 207. The failure-probability inferring module 207 includes a determination-probability calculating module 302, a first Bayesian network 303, an occurrence-probability calculating module 304, a second Bayesian network 305, a multiplication module 306, and a sum-total calculating module 307.

An observation-information acquiring module 301 corresponds to any or a combination of the parts-status-information acquiring module 201, the history-information acquiring module 202, the environmental-information acquiring module 203, the image-defect-type-determination-information extracting module 204 and the feature-amount extracting module 205. This means that the failure-probability acquiring module 207 acquires plural pieces of observation information from the image forming apparatus 1, which is a system to be diagnosed.

The first Bayesian network 303 is stored in a storage device such as a hard disk and stochastically represents a relationship among plural failure types and the observation information, which have the cause-and-effect relations with the respective failure types.

The determination-probability calculating module 302 calculates a determination probability of each failure-type candidate based on (i) the observation information acquired by the observation-information acquiring module 301 and (ii) the first Bayesian network 303.

The second Bayesian network 305 is stored in a storage device such as a hard disk. The second Bayesian network 305 is plural second Bayesian networks for stochastically representing, for each failure type, relationships between the observation information of the failure type and the failure causes.

The occurrence-probability calculating module 304 calculates an occurrence probability of each failure cause candidate for each failure type based on (i) the observation information acquired by the observation-information acquiring module 301 and (ii) the second Bayesian network 305.

The multiplication module 306 multiplies (i) the determination probability calculated by the determination-probability calculating module 302 by (ii) the occurrence probability of each failure cause candidate calculated by the occurrence-probability calculating module 304.

The sum-total calculating module 307 calculates a sum total of the multiplication results, provided by the multiplication module 306, of each failure cause candidate common to the second Bayesian networks 305.

The diagnosis-result notifying module 208 notifies the user of the failure causes in order of the sum totals calculated by the sum-total calculating module 307 (from high to low).

Figure 4:
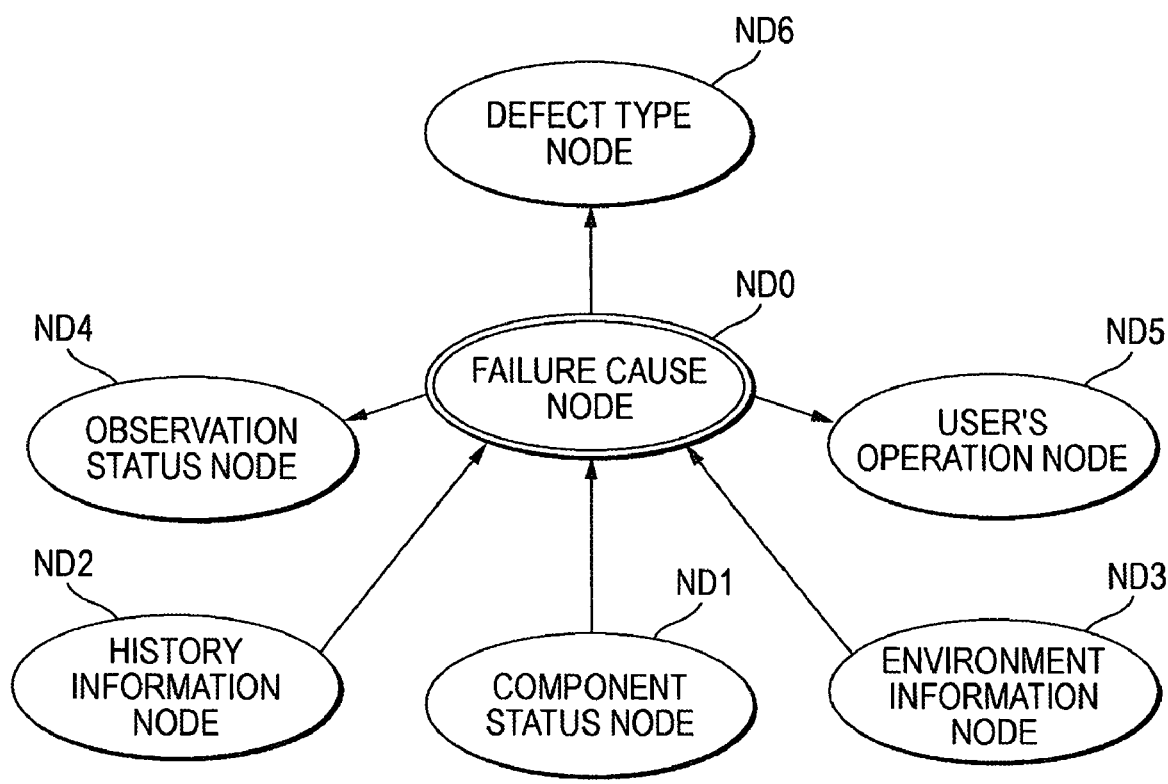
FIG. 4 is a drawing to show a configuration example of a Bayesian network for conducting a failure diagnosis of an image defect system.

FIG. 4 shows ideally a configuration example of the Bayesian network for conducting the failure diagnosis of the image defect system. As shown in FIG. 4, the Bayesian network includes: a failure cause node ND0 representing a cause of an image defect; a component status node ND1 representing status information of the components making up the image forming apparatus 1; a history information node ND2 representing the history information of the image forming apparatus 1; an environment information node ND3 representing information (environment information) of an ambient environment in which the image forming apparatus 1 is installed; an observation status node ND4 representing the status information of the image defect; a user operation node ND5 representing additional result information obtained by the user's operation; and a defect type node ND6.

The failure cause node ND0 is a node representing the cause of an image defect. Whether or not a failure occurs is determined by calculating the probability of the failure cause node ND0. Each node stores a probability table listing probability data, which represents the strength of the cause-and-effect relationships. The initial values of the probability data may be determined using data at the time when past failures occurred and MTBF (Mean Time Between Failures) of parts.

The component status node ND1 is a node representing the statuses of the respective components and is information acquired from the sensor module 103, which observes the statuses of the respective components. Such information may include component temperature, applied voltage, batch density and color material (for example, toner) remaining amount.

The history information node ND2 represents the usage status of the image forming apparatus 1. For example, the usage status may be a history of the number of print sheets in the past for each component. The number of print sheets directly affects the status of each component such as abrasion and degradation of the component.

The environment information node ND3 is the ambient environment conditions affecting the statuses of the respective components. The temperature and the humidity may correspond to the ambient environment conditions. The temperature and the humidity affect the image formation condition and the operation condition of each component.

The observation status node ND4 represents the observation status of a defect occurring in the output image and is information observed and input by the user. For example, the information input by the user may include information of the result shape, size, density, contours, direction (orientation), position, periodicity and occurrence area.

The user operation node ND5 is information for causing the image forming apparatus 1 to perform a similar process with the operation condition being changed. For example, such information may include information of the operation condition after change.

The defect type node ND6 represents types of image defects and may include information of line, point, white patch and density unevenness. First, a type of an image defect, which occurred, is determined, the status of the node is determined, and then information of the other nodes (ND1 to ND5) is input to the ND6 appropriately, a diagnosis is conducted, and the failure cause is estimated.

The nodes are connected so as to become the relationship of "cause"->"result." That is, the nodes are connected so that the failure cause node ND0->the observation status node ND4, the failure cause node ND0->the defect type node ND6, the failure cause node ND0->the user operation node ND5, the history information node ND2->the failure cause node ND0, the component status node ND1->the failure cause node ND0, the environment information node ND3->the failure cause node ND0.

For example, the relationship between "the failure cause node ND0" and "the observation status node ND4" becomes such a relationship that "observation status (thin density, stripe and belt)" appears based on the "cause." On the other hand, the relationship between "the history information node ND2" and "the failure cause node ND0" becomes such a relationship that "cause (parts degradation)" occurs due to "status based on history information (the number of copies is large and/or the number of operation years is long)."

Figure 5:
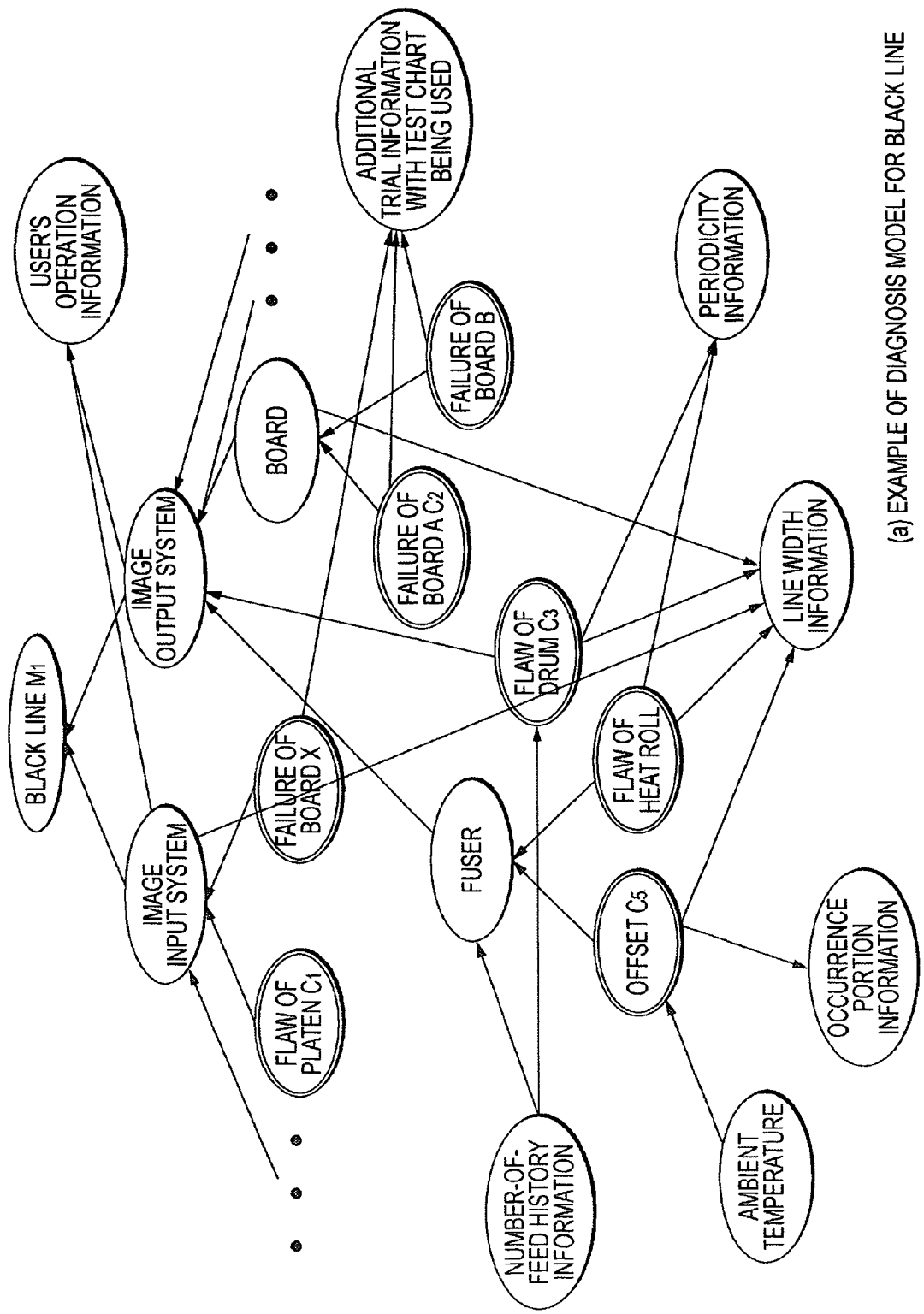
FIG. 5 is a drawing to show a configuration example of the Bayesian network in the configuration example of the failure diagnosis of the image defect when a black line occurs.

FIG. 5 shows a specific example of a failure diagnosis model in the failure diagnosis system, and represents the Bayesian network when a black line appears due to an image defect in the configuration example of the failure diagnosis. The nodes are connected so as to become the relationship of "cause"->"result" as with FIG. 4. For example, the relationship between "flaw of the drum C3" and "line width information" becomes such a relationship that "flaw of the drum C3" is a cause and "line width information" indicating occurrence of a thin line appears. On the other hand, the relationship between "number-of-feed history information" and "fuser" becomes such a relation that a status based on the "number of feeds" (the number of feeds is equal to or greater than what number) is a cause and the possibility of occurrence of a black line caused by degradation of the "fuser" increases.

Figure 6:
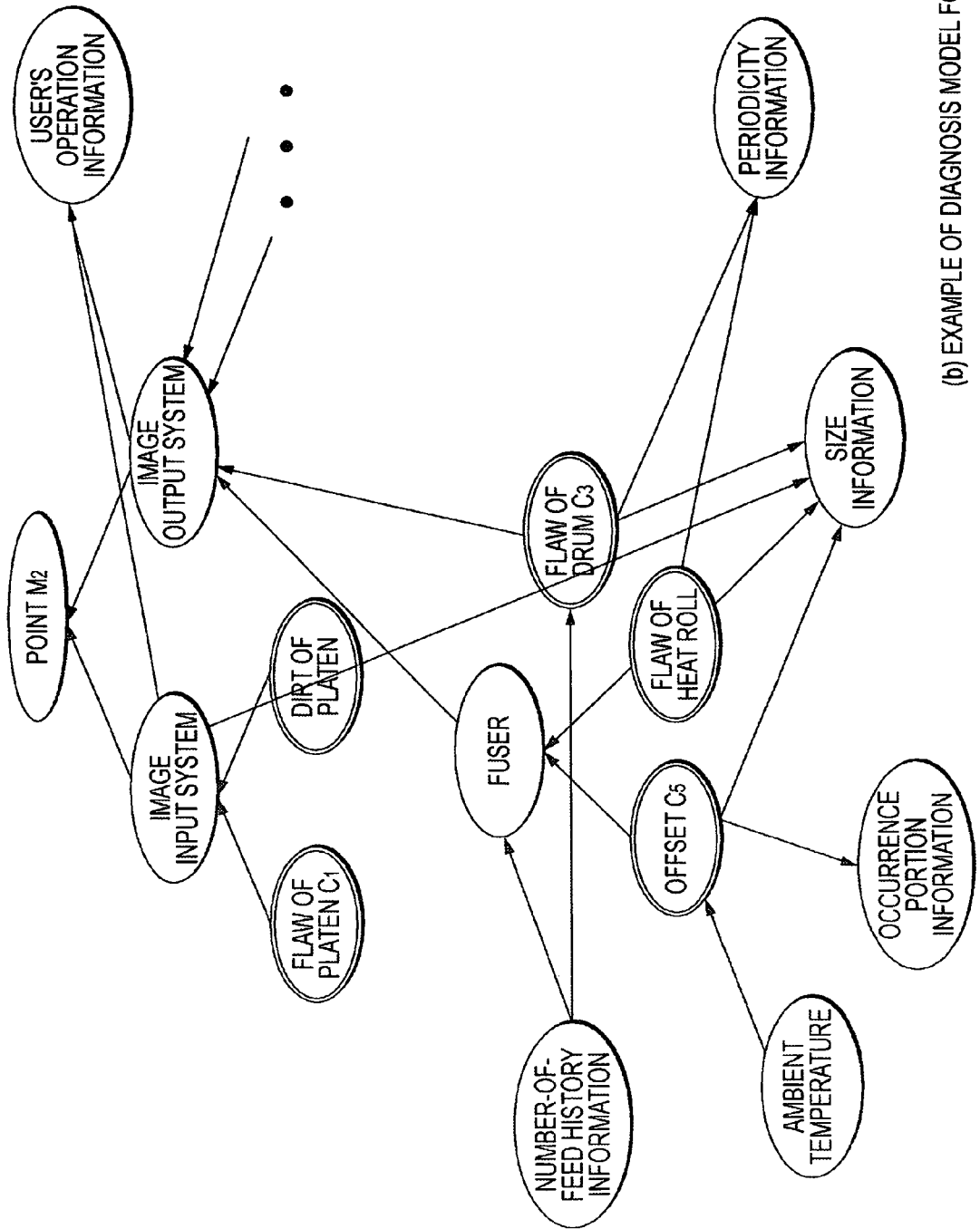
FIG. 6 is a drawing to show a configuration example of the Bayesian network in the configuration example of the failure diagnosis of the image defect when a point occurs.
Figure 7:
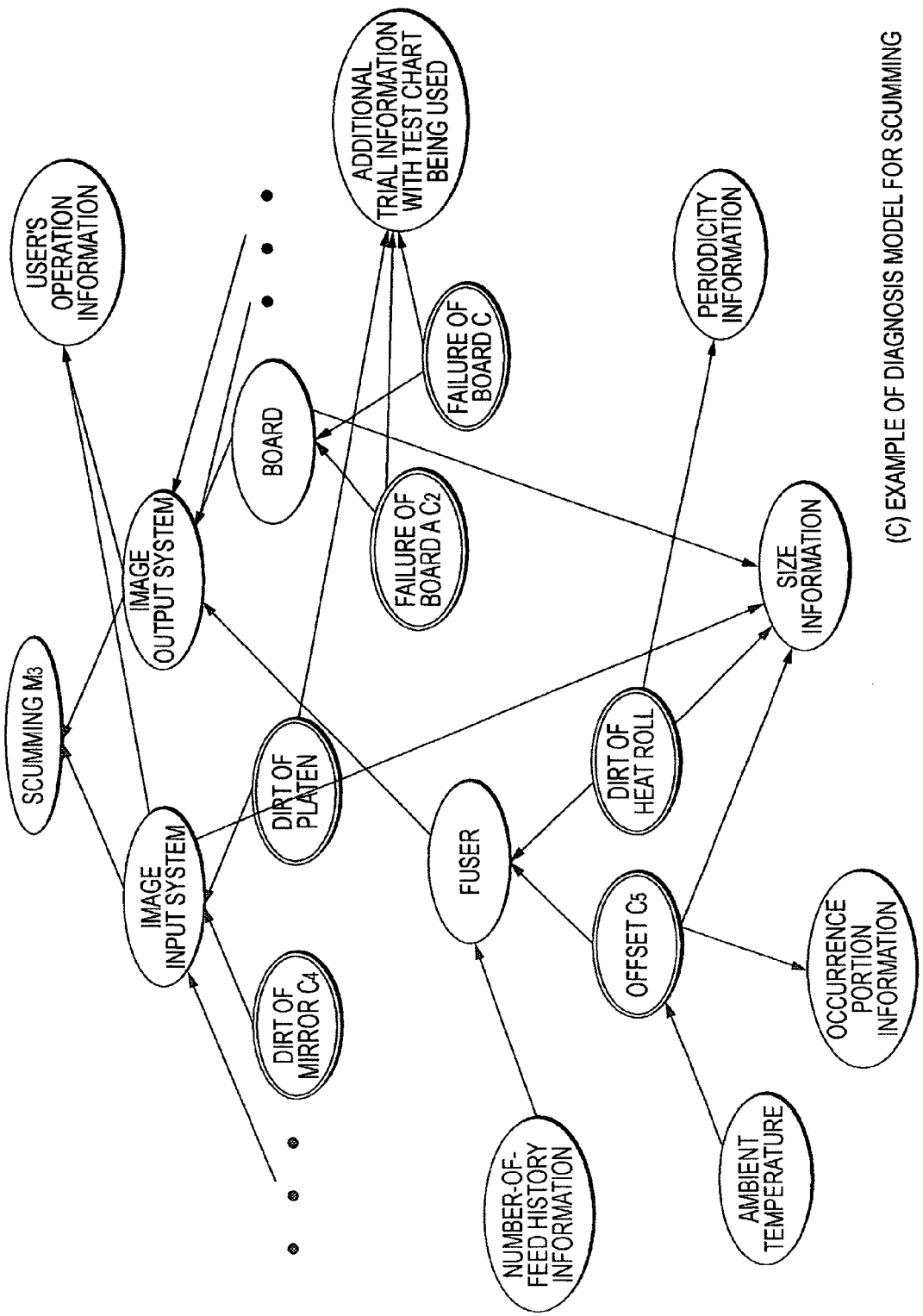
FIG. 7 is a drawing to show a configuration example of the Bayesian network in the configuration example of the failure diagnosis of the image defect when scumming occurs.

Likewise, FIG. 6 shows the Bayesian network at the time when a point, which is an image defect, occurs. For example, FIG. 6 shows such a relationship that "dirt of a platen" is a cause and a point caused by "image input (scanner) system" occurs. FIG. 7 shows the Bayesian network at the time when scumming, which is an image defect, occurs. For example, FIG. 7 shows such a relationship that "dirt of a heat roll" is a cause and scumming having a period corresponding to the outer periphery of the heat roll occurs.

The initial value of the probability data of each node is determined based on the past data, for example. Thereafter, the probability of each node may be updated at regular time intervals based on statistic data of market trouble such as part replacement frequency and defective condition occurrence frequency. A status of each node representing the image defect features such as "line width information," "periodicity information," and "occurrence point information" shown in FIGS. 5, 6, and 7 is determined based on the feature amounts obtained by the parts-status-information acquiring module 201, the history-information acquiring module 202 and the environmental-information acquiring module 203 shown in FIG. 2.

Next, the operation will be described. An outline of a process procedure of the failure diagnosis in association with an image defect will be described with a flowchart of FIG. 8.

First, at step S801, the user changes the image forming apparatus 1 to a failure diagnosis mode through an operation screen, and the print engine module 102 of the image forming apparatus 1 outputs a test pattern for failure diagnosis (a sheet of output paper 100). The test pattern output here may be stored in the print engine module 102 shown in FIG. 1 in advance. If a cause of the failure is a part of the print engine module 102, the defect is reproduced on the test pattern, but if the cause is a part of the image reading module 101 such as a defect only occurring in copying, the defect is not reproduced on the test pattern. However, if the cause is a part of the image reading module 101, when the test pattern is placed on the image reading module 101 and an output image is read, the defect appears on the read image. Therefore, the system inquires of the user as to whether or not the defect occurs only in copying, through the operation screen before the output image is read. The system allows the user to selectively input information regarding this inquiry. The additional-operation-information acquiring module 206 acquires and inputs the selected information to the failure-probability inferring module 207.

At step S802, when the print engine module 102 of the image forming apparatus 1 discharges the test pattern, the user places the test pattern on the image reading module 101, which then reads the output image.

Next, at step S803, the image-defect-type-determination-information extracting module 204 of the failure diagnosis module 105 compares the read image with the reference image, which is stored in the image forming apparatus 1 in advance, to check as to whether or not an image defect exists in the read image.

At step S804, if a defect is not detected at step S803 (N at step S804), there is a possibility that the previous defect might occur accidentally or may be already resolved by conducting some treatment before the test pattern is output. Therefore, the diagnosis result notifying module 208 notifies the user of such a fact through the operation screen, and the process is terminated. On the other hand, if a defect is detected (Y at step S804), the process goes to step S805.

At step S805, the image-defect-type-determination-information extracting module 204 extracts the feature amount required to determine a defect type.

Next, at step S806, the feature-amount extracting module 205 extracts a defect feature amount required for diagnosis conducted by the diagnosis model of each defect type.

Further, at step S807, the parts-status-information acquiring module 201, the history-information acquiring module 202 and the environmental-information acquiring module 203 acquire various pieces of data required for failure diagnosis, such as (i) the status information of the parts making up the image forming apparatus 1, (ii) the history information of a counter value indicating the number of print sheets for each part, and (iii) the environment information such as the temperature in the apparatus and the humidity in the apparatus.

At step S808, when the failure-probability inferring module 207 receives data from the image-defect-type-determination-information extracting module 204, the feature-amount extracting module 205, the parts-status-information acquiring module 201, the history-information acquiring module 202, and the environmental-information acquiring module 203, the failure-probability inferring module 207 calculates the occurrence probability of each failure cause using the inference engine 210. Details of the process at step S808 will be described later.

At step S809, the failure-candidate extracting module 209 extracts failure causes as many as the designated number of candidates in the probability order of the failure cause (from high to low) based on the calculated probabilities. The user may be allowed to set the number of candidates in advance or to input any desired number before the candidates are extracted.

At step S810, the diagnosis-result notifying module 208 displays the diagnosis result for the user on a display device such as a control panel. If the failure cause candidates has be narrowed down at this stage (No at step S811), the process is terminated.

However, in such automatic determination process, the failure cause candidates may not always be narrowed down to one at this point in time. If the failure cause candidates cannot be narrowed down to one at this point in time (Yes at step S811), a user further selects an additional operation item required for the failure diagnosis through the operation screen, and the operation condition of the image forming apparatus 1 is changed in accordance with the selected item and the print engine module 102 again outputs an image.

At step S812, the user inputs information of the additional trial result through the operation screen. The additional operation at this time may be scaling up or down of an image or be outputting of a test pattern. The additional operation is intended to check presence or absence of change in the defect occurrence status. Therefore, the additional trial result is at a level at which the user can easily input the additional trial result in accordance with a question displayed on the operation screen. The added information and the information, which has already been input, are collected and the failure cause probability is re-calculated and the failure candidates are narrowed down from the result. If the failure candidates can be narrowed down or if there remains no information to be added although the failure candidates are not narrowed down (No at step S811), the process is terminated.

Figure 9:
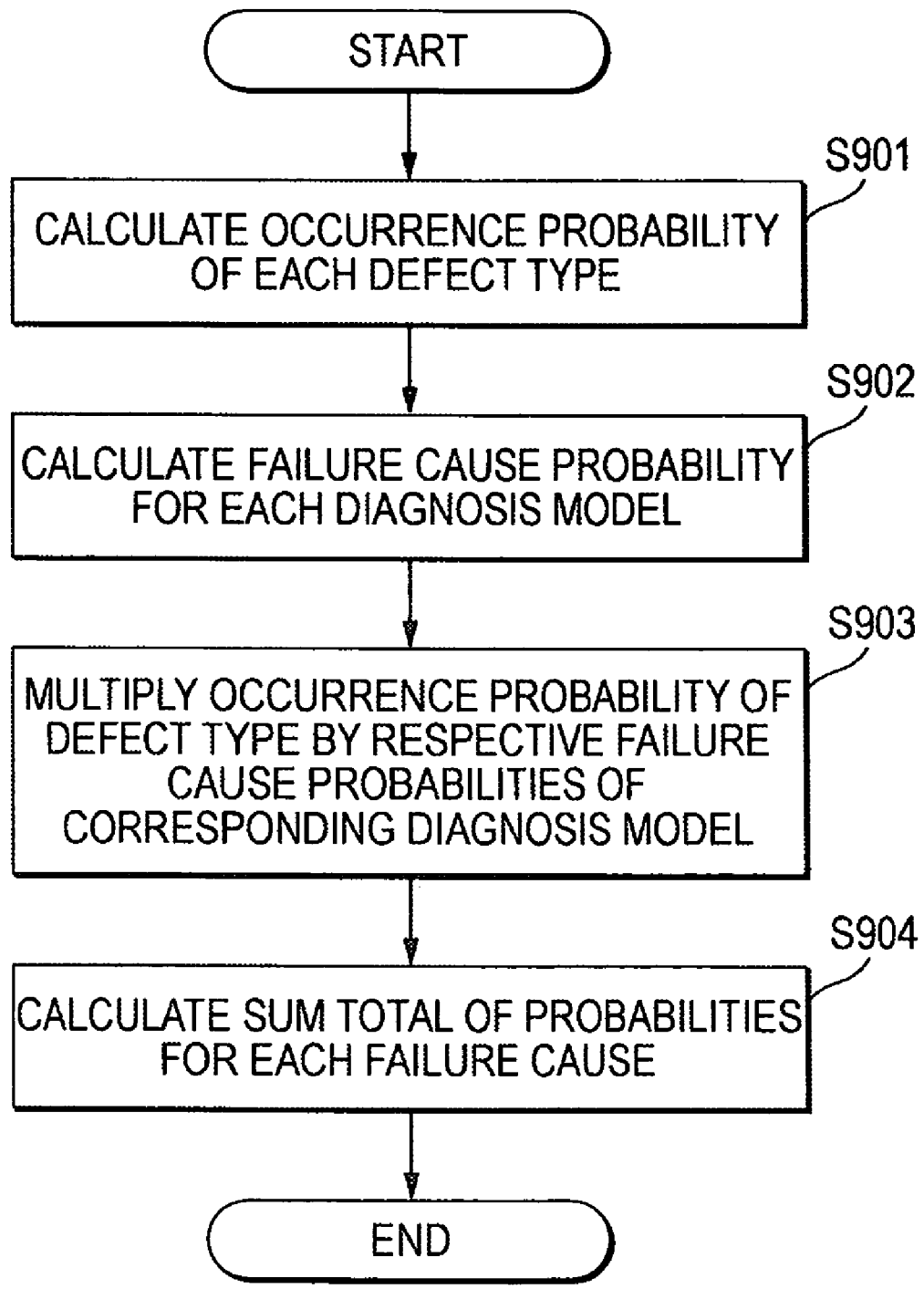
FIG. 9 is a flowchart to show an example of a process procedure for calculating occurrence probabilities of failure causes of image defects.

Next, the process of calculating the occurrence probability of each failure cause described at step S808 will be described in detail with reference to FIGS. 9 to 11. FIG. 9 is a flowchart to show the process of calculating the occurrence probability of each failure cause.

At step S901, first the failure-probability inferring module 207 calculates the occurrence probability of each defect type (determination probability of each failure-type candidate) based on the feature amounts (e.g., defect in area, defect in shape or defect in density) received from the image-defect-type-determination-information extracting module 204. At this time, to calculate the occurrence probability of each defect type, the failure-probability inferring module 207 uses a defect type determination model formed of the Bayesian network, which is constructed based on the cause-and-effect relations between n defect types and m feature amounts as shown in FIG. 10. the failure-probability inferring module 207 gives to feature nodes Fi (i=1 to m) of the defect type determination model, evidence information based on the feature amounts received from the image-defect-type-determination-information extracting module 204. Then, the failure-probability inferring module 207 calculates occurrence probability of each defect type P (Mi) (i=1 to n). Alternatively, the failure-probability inferring module 207 may use a mode formed of a neural network.

Next, at step S902, with regard to each of l types of failure causes in total, the failure-probability inferring module 207 calculates the occurrence probabilities of the defect types P(Cj) (j=1 to l) (probabilities that the respective failure cause candidates occur), which are contained in the diagnosis models for the respective defect types, based on the data received from the feature-amount extracting module 205, the parts-status-information acquiring module 201, the history-information acquiring module 202 and the environmental-information acquiring module 203. FIG. 11 is a table showing an example of failure cause occurrence probability calculation examples related to the diagnosis models of the defect types shown in FIGS. 5 to 7. As shown in FIG. 11, first the failure-probability inferring module 207 calculates the occurrence probabilities of the failure causes included in each diagnosis model.

Next, at step S903, the multiplication module 306 multiplies the occurrence probability of each defect type by the failure cause probability calculated for each diagnosis model of the defect type.

At step S904, the sum-total calculating module 307 calculates a sum total $\Sigma P(Mi) \cdot P(Cij)$ of the multiplication values of the probabilities calculated at step S903, for each failure cause common to the diagnosis models for the respective defect types as shown in FIG. 11. Each blank cell in the table of FIG. 11 represents that no diagnosis model of the corresponding failure cause exists and that the probability of the portion is 0%. The diagnosis-result notifying module 208 notifies the user of the failure causes in the descending order of the sum totals of the probability values at step S810 based on the calculation results.

The exemplary embodiment described relates to the failure diagnosis in the image forming apparatus. However, the invention is not limited thereto. The invention may be applied to any other failure diagnosis, and particularly to an apparatus for determining a type of defect detected by surface inspection of a specimen in a manufacturing process line of the specimen such as a semiconductor wafer or a liquid crystal glass substrate.

The described program may also be stored in a computer readable recording medium.

The term "computer readable recording medium storing a program" is used to mean a recording medium which can be read by a computer, which stores the program, which is used to install and execute the program and which is used to distribute the program.

The record media may include "DVD-R, DVD-RW and DVD-RAM" of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a recording medium together with a different program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

FIG. 1
1 IMAGE FORMING APPARATUS
101 IMAGE READING MODULE
102 PRINT ENGINE MODULE
103 SENSOR MODULE
104 DIAGNOSIS INFORMATION
105 FAILURE DIAGNOSIS MODULE
106 COMMUNICATION MODULE
110 CENTER

FIG. 2
101 IMAGE READING MODULE
105 FAILURE DIAGNOSIS MODULE
201 PARTS-STATUS-INFORMATION ACQUIRING MODULE
202 HISTORY-INFORMATION ACQUIRING MODULE
203 ENVIRONMENTAL-INFORMATION ACQUIRING MODULE
204 IMAGE-DEFECT-TYPE-DETERMINATION-INFORMATION EXTRACTING MODULE
205 FEATURE-AMOUNT EXTRACTING MODULE
206 ADDITIONAL-OPERATION-INFORMATION ACQUIRING MODULE
207 FAILURE-PROBABILITY INFERRING MODULE
208 DIAGNOSIS-RESULT NOTIFYING MODULE
209 FAILURE-CANDIDATE EXTRACTING MODULE
(A) NOTIFY TO USER

FIG. 3
208 DIAGNOSIS-RESULT NOTIFYING MODULE
301 OBSERVATION-INFORMATION ACQUIRING MODULE
302 DETERMINATION-PROBABILITY CALCULATING MODULE
304 OCCURRENCE-PROBABILITY CALCULATING MODULE
305 SECOND BAYESIAN NETWORK
306 MULTIPLICATION MODULE
307 SUM-TOTAL CALCULATING MODULE

FIG. 4
ND0 FAILURE CAUSE NODE
ND1 COMPONENT STATUS NODE
ND2 HISTORY INFORMATION NODE
ND3 ENVIRONMENT INFORMATION NODE
ND4 OBSERVATION STATUS NODE
ND5 USER'S OPERATION NODE
ND6 DEFECT TYPE NODE

FIG. 5
1. BLACK LINE M1
2. USER'S OPERATION INFORMATION
3. IMAGE INPUT SYSTEM
4. IMAGE OUTPUT SYSTEM
5. FLAW OF PLATEN C1

6. FAILURE OF BOARD X
7. BOARD
8. FAILURE OF BOARD A C2
9. FAILURE OF BOARD B
10. ADDITIONAL TRIAL INFORMATION WITH CHART BEING USED
11. NUMBER-OF-FEED HISTORY INFORMATION
12. FUSER
13. FLAW OF DRUM C3
14. OFFSET C5
15. FLAW OF HEAT ROLL
16. AMBIENT TEMPERATURE
17. OCCURRENCE PORTION INFORMATION
18. LINE WIDTH INFORMATION
19. PERIODICITY INFORMATION
20. EXAMPLE OF DIAGNOSIS MODEL FOR BLACK LINE

FIG. 6
1. POINT M2
2. USER'S OPERATION INFORMATION
3. IMAGE INPUT SYSTEM
4. IMAGE OUTPUT STSTEM
5. FLAW OF PLATEN C1
6. DIRT OF PLATEN
7. NUMBER-OF-FEED HISTORY INFORMATION
8. FUSER
9. FLAW OF DRUM C3
10. OFFSET C5
11. FLAW OF HEAT ROLL
12. AMBIENT TEMPERATURE
13. OCCURRENCE PORTION INFORMATION
14. SIZE INFORMATION
15. PERIODICITY INFORMATION
16. EXAMPLE OF DIAGNOSIS MODEL FOR POINT

FIG. 7
1. SCUMMING M3
2. USER'S OPERATION INFORMATION
3. IMAGE INPUT SYSTEM
4. IMAGE OUTPUT SYSTEM
5. DIRT OF MIRROR C4
6. DIRT OF PLATEN
7. BOARD
8. FAILURE OF BOARD A C2
9. FAILURE OF BOARD C
10. ADDITIONAL TRIAL INFORMATION WITH TEST CHART BEING USED
11. NUMBER-OF-FEED HISTORY INFORMATION
12. FUSER
13. OFFSET C5
14. DIRT OF HEAT ROLL
15. AMBIENT TEMPERATURE
16. OCCURRENCE PORTION INFORMATION
17. SIZE INFORMATION
18. PERIODICITY INFORMATION
19. EXAMPLE OF DIAGNOSIS MODEL FOR SCUMMING

Figure 8:
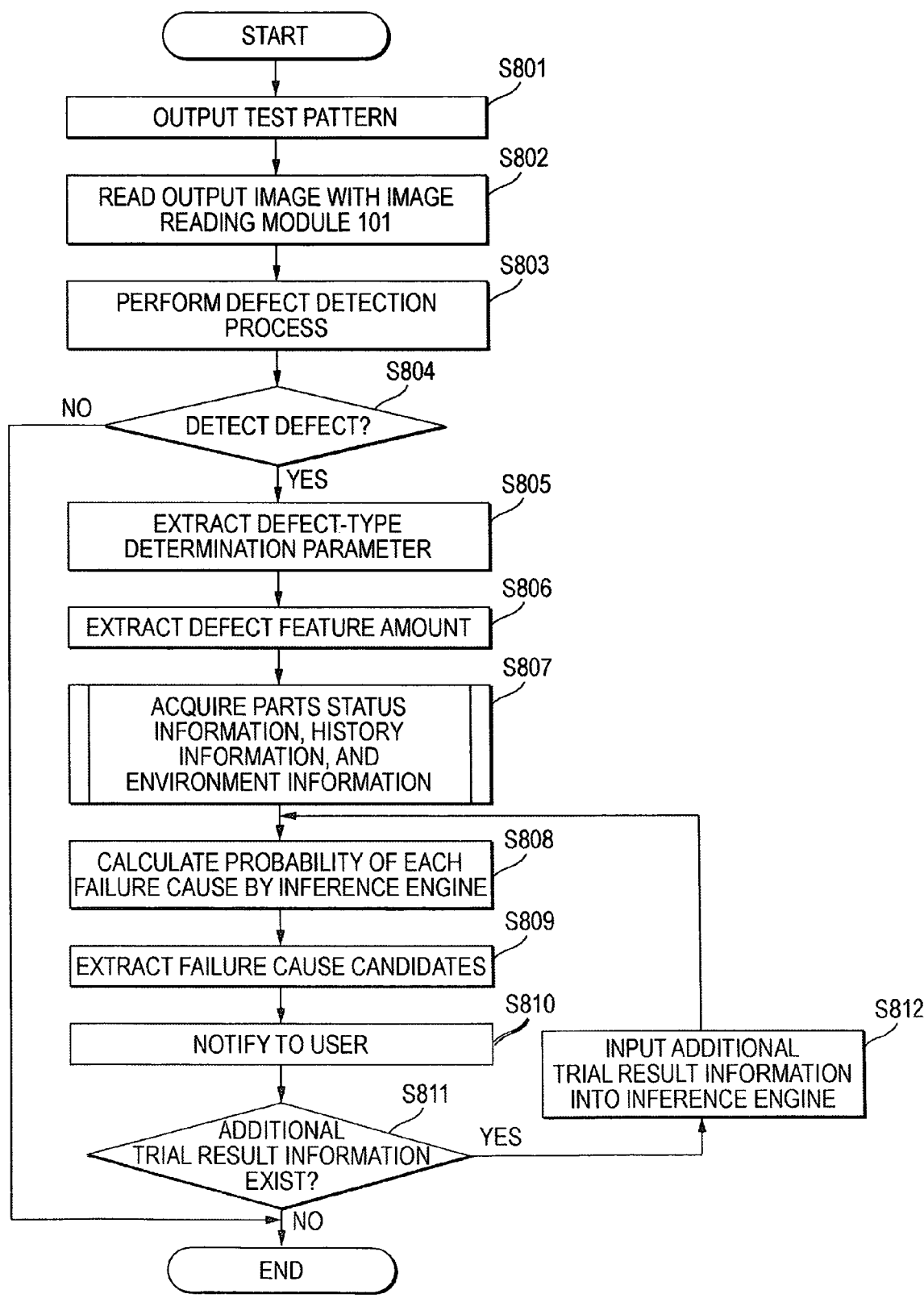
FIG. 8 is a flowchart to show an example of a process procedure of a failure diagnosis system.

FIG. 8
S801 OUTPUT TEST PATTERN
S802 READ OUTPUT IMAGE WITH READING MODULE 101
S803 PERFORM DEFECT DETECTION PROCESS
S804 DETECT DEFECT?
S805 EXTRACT DEFECT-TYPE DETERMINATION PARAMETER
S806 EXTRACT DEFECT FEATURE AMOUNT
S807 ACQUIRE PARTS STATUS INFORMATION, HISTORY INFORMATION, AND ENVIRONMENT INFORMATION
S808 CALCULATE PROBABILITY OF EACH FAILURE CAUSE BY INFERENCE ENGINE
S809 EXTRACT FAILURE CAUSE CANDIDATES
S810 NOTIFY TO USER
S811 ADDITIONAL TRIAL RESULT INFORMATION EXIST?
S812 INPUT ADDITIONAL TRIAL RESULT INFORMATION INTO INFERENCE ENGINE

FIG. 9
S901 CALCULATE OCCURRENCE PROBABILITY OF EACH DEFECT TYPE
S902 CALCULATE FAILURE CAUSE PROBABILITY FOR EACH DIAGNOSIS MODEL
S903 MULTIPLY OCCURRENCE PROBABILITY OF DEFECT TYPE BY RESPECTIVE FAILURE CAUSE PROBABILITIES OF CORRESPONDING DIAGNOSIS MODEL
S904 CALCULATE SUM TOTAL OF PROBABILITIES FOR EACH FAILURE CAUSE

Figure 10:
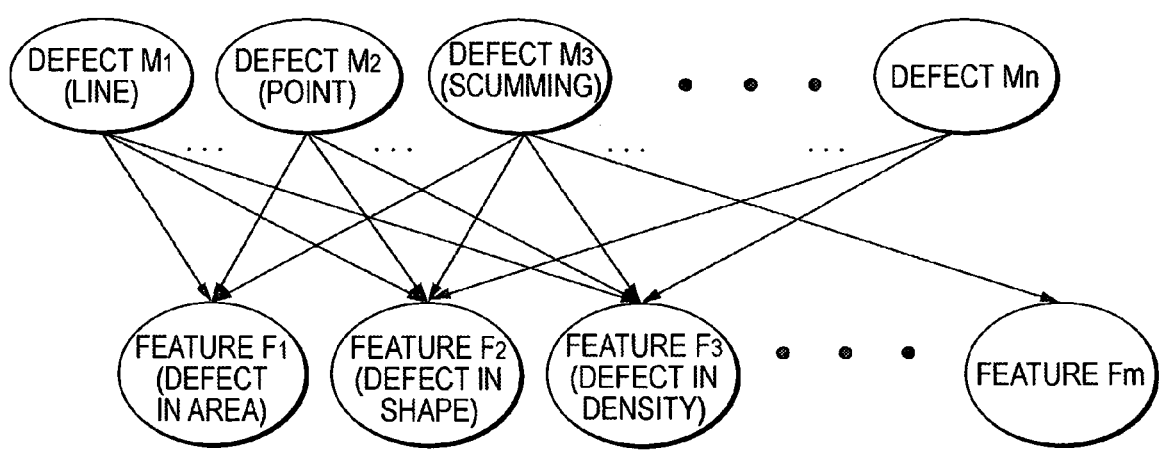
FIG. 10 is a drawing to show a configuration example of the Bayesian network for calculating determination probabilities of defect types.

FIG. 10
1. DEFECT M1 (LINE)
2. DEFECT M2 (POINT)
3. DEFECT M3 (SCUMMING)
4. DEFECT Mn
5. FEATURE F1 (DEFECT IN AREA)
6. FEATURE F2 (DEFECT IN SHAPE)
7. FEATURE F3 (DEFECT IN DENSITY)
8. FEATURE FM

FIG. 11
1. DIAGNOSIS MODEL
2. OCCURRENCE PROBABILITY OF DEFECT TYPE
3. PROBABILITY OF FAILURE CAUSE (FLAW OF PLATEN) C1
4. PROBABILITY OF FAILURE CAUSE (FAILURE OF BOARD A) C2
5. PROBABILITY OF FAILURE CAUSE (FLAW OF DRUM) C3
6. PROBABILITY OF FAILURE CAUSE (DIRT OF MIRROR) C4
7. PROBABILITY OF FAILURE CAUSE (FUSER OFFSET) C5
8. M1: LINE
9. M2: POINT
10. M3: SCUMMING
11. TOTAL SUM OF PROBABILITIES

What is claimed is:
1. A failure diagnosis system comprising:
a first database that stores a first cause-and-effect network, wherein the first cause-and-effect network stochastically represents a relationship between a plurality of failure-type candidates and first observation information, which have cause-and-effect relationships with the respective failure-type candidates, and
a second database that stores a plurality of second cause-and-effect networks for the respective failure-type candidates, wherein each of the second cause-and-effect networks stochastically represents relationships between second observation information and the failure-cause candidates;

an observation-information acquiring unit that acquires the first observation information and the second observation information from a diagnosed system;

a determination-probability calculating unit that calculates a determination probability of each failure-type candidate based on the first observation information acquired by the observation-information acquiring unit and the first cause-and-effect network;

an occurrence-probability calculating unit that calculates occurrence probabilities of the failure-cause candidates for each failure-type candidate based on the second observation information acquired by the observation-information acquiring unit and the second cause-and-effect networks;

a failure-cause notifying unit that notifies at least one of the failure-cause candidates as a failure cause, based on the determination probabilities of the respective failure-type candidates calculated by the determination-probability calculating unit and the occurrence probabilities of the respective failure-cause candidates calculated by the occurrence-probability calculating unit; and a multiplication unit that multiplies (i) the determination probability of each failure-type candidate by (ii) the respective occurrence probabilities of the failure-cause candidates for the failure-type candidate, wherein, the failure-cause notifying unit notifies the at least one of the failure-cause candidates based on multiplication results calculated by the multiplication unit.

2. The system according to claim 1, further comprising:
a sum-total calculating unit that calculates a sum total of the multiplication results, calculated by the multiplication unit, of each failure-cause candidate common to the second cause-and-effect networks, wherein:

the failure-cause notifying unit notifies at least part of the failure-cause candidates in descending order of the total sums calculated by the sum-total calculating unit.

3. The system according to claim 1, further comprising:
a multiplication unit that calculates $P(Mi) \times P(Cij)$ (i=1, 2, ... n; and j=1, 2, ... m), where:

n denotes natural number;

m denotes natural number;

Mi denotes the respective failure-type candidates;

Cij denotes the respective failure-cause candidates for the corresponding failure-type candidate Mi;

$P(Mi)$ denotes the respective determination probabilities of the failure-type candidates Mi; and $P(Cij)$ denotes the respective occurrence probabilities of the failure-cause candidates Cij, wherein:

the failure-cause notifying unit notifies the at least one of the failure-cause candidates based on $P(Mi) \times P(Cij)$ calculated by the multiplication unit.

4. The system according to claim 3, further comprising:
a sum-total calculating unit that calculates $$\sum_f P(Mi) \times P(Cij),$$

wherein:
the failure-cause notifying unit notifies at least part of the failure-cause candidates in descending order of $$\sum_f P(Mi) \times P(Cij)$$

calculated by the sum-total calculating unit.

5. An image forming apparatus comprising:
a print engine unit that forms an image on a sheet of paper; and
the system according to claim 1.

6. A computer readable storage medium storing a program causing a computer to execute a process for a failure diagnosis, the process comprising:

acquiring first observation information and second observation information from a diagnosed system;

calculating a determination probability of each failure-type candidate based on the acquired first observation information and a first cause-and-effect network, wherein the first cause-and-effect network stochastically represents a relationship between the plurality of failure-type candidates and the first observation information, which have cause-and-effect relationships with the respective failure-type candidates;

calculating occurrence probabilities of failure-cause candidates for each failure-type candidate based on the acquired second observation information and a plurality of second cause-and-effect networks for the respective failure-type candidates, wherein each second cause-and-effect network stochastically represents relationships between the second observation information of the failure-type candidate and the failure-cause candidates;

notifying at least one of the failure-cause candidates as a failure cause, based on the calculated determination probabilities of the respective failure-type candidates and the calculated occurrence probabilities of the respective failure-cause candidates; and multiplying (i) the determination probability of each failure-type candidate by (ii) the respective occurrence probabilities of the failure-cause candidates for the failure-type candidate, wherein, the at least one of the failure-cause candidates is notified based on the multiplication results of multiplying the determination probability of each failure-type candidate by the respective occurrence probabilities of the failure-cause candidates for the failure-type candidate.

* * * * *